(12) United States Patent
Garg et al.

(10) Patent No.: US 11,516,341 B2
(45) Date of Patent: Nov. 29, 2022

(54) TELEPHONE CALL SCREENER BASED ON CALL CHARACTERISTICS

(71) Applicant: T-Mobile USA, Inc., Bellevue, WA (US)

(72) Inventors: Parag Garg, Woodinville, WA (US); Nicholas LaVassar, Issaquah, WA (US); George MacDonald, Newcastle, WA (US); Homer Nicolas B. Filart, Renton, WA (US); Derrick Ives, North Bend, WA (US); Michele Lundahl, Yarrow Point, WA (US); Kathleen Foster, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/236,967

(22) Filed: Apr. 21, 2021

(65) Prior Publication Data

US 2022/0345570 A1 Oct. 27, 2022

(51) Int. Cl.
*H04M 3/436* (2006.01)
*H04M 3/42* (2006.01)

(52) U.S. Cl.
CPC ....... *H04M 3/436* (2013.01); *H04M 3/42042* (2013.01); *H04M 2203/2027* (2013.01); *H04M 2203/2033* (2013.01); *H04M 2203/6027* (2013.01)

(58) Field of Classification Search
None
See application file for complete search history.

(56) References Cited

U.S. PATENT DOCUMENTS

| | | |
|---|---|---|
| 6,763,092 B1 | 7/2004 | Borland |
| 6,895,237 B1 | 5/2005 | Scott |
| 8,443,049 B1 * | 5/2013 | Geddes ................ H04L 63/126 709/208 |
| 8,520,826 B2 | 8/2013 | Koch |
| 8,681,968 B2 | 3/2014 | Vendrow |
| 8,744,061 B2 | 6/2014 | Brahm et al. |
| 8,761,356 B2 | 6/2014 | Martin |
| 8,767,925 B2 | 7/2014 | Sureka et al. |
| 9,699,305 B1 | 7/2017 | Compert et al. |
| 9,832,312 B2 | 11/2017 | Christie |
| 9,942,406 B2 | 4/2018 | Walker et al. |
| 10,798,241 B1 | 10/2020 | Quilici et al. |

(Continued)

OTHER PUBLICATIONS

European Patent Application No. 22168923.5, Extended European Search Report dated Aug. 26, 2022, 7 pages.

*Primary Examiner* — Harry S Hong
(74) *Attorney, Agent, or Firm* — Han Santos, PLLC

(57) ABSTRACT

Methods, systems, and apparatus, including computer programs encoded on a computer storage medium, for implementing a telephone call screener are disclosed. In one aspect, a method includes the actions of receiving a telephone call. The actions further include determining characteristics of the telephone call. The actions further include, based on the characteristics of the telephone call, determining a level of screening to apply to the telephone call. The actions further include determining screening data based on screening the telephone call according to the level of screening. The actions further include providing, for output, the screening data.

18 Claims, 4 Drawing Sheets

(56) References Cited

U.S. PATENT DOCUMENTS

| | | |
|---|---|---|
| 2003/0152199 A1 | 8/2003 | Kuhn et al. |
| 2006/0182029 A1* | 8/2006 | Kealy ................... H04L 51/12 370/352 |
| 2006/0198509 A1* | 9/2006 | Karnalkar ............ H04Q 3/0029 379/239 |
| 2008/0084975 A1* | 4/2008 | Schwartz .............. H04M 3/436 379/88.22 |
| 2008/0247529 A1 | 10/2008 | Barton et al. |
| 2009/0003549 A1* | 1/2009 | Baird ................... H04M 3/493 379/88.18 |
| 2018/0152558 A1 | 5/2018 | Chan et al. |

* cited by examiner

TELEPHONE CALL SCREENER BASED ON CALL CHARACTERISTICS

BACKGROUND

Call screening is the process of evaluating the characteristics of a telephone call before deciding whether to answer the telephone call. There are various methods used to screen telephone calls. A first method may be listening to a voicemail as the caller is recording the voicemail. A second method may be checking the caller identification to determine who is calling. A third method may be to have a person answer the telephone call to gather information before transferring the telephone call to the called party.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
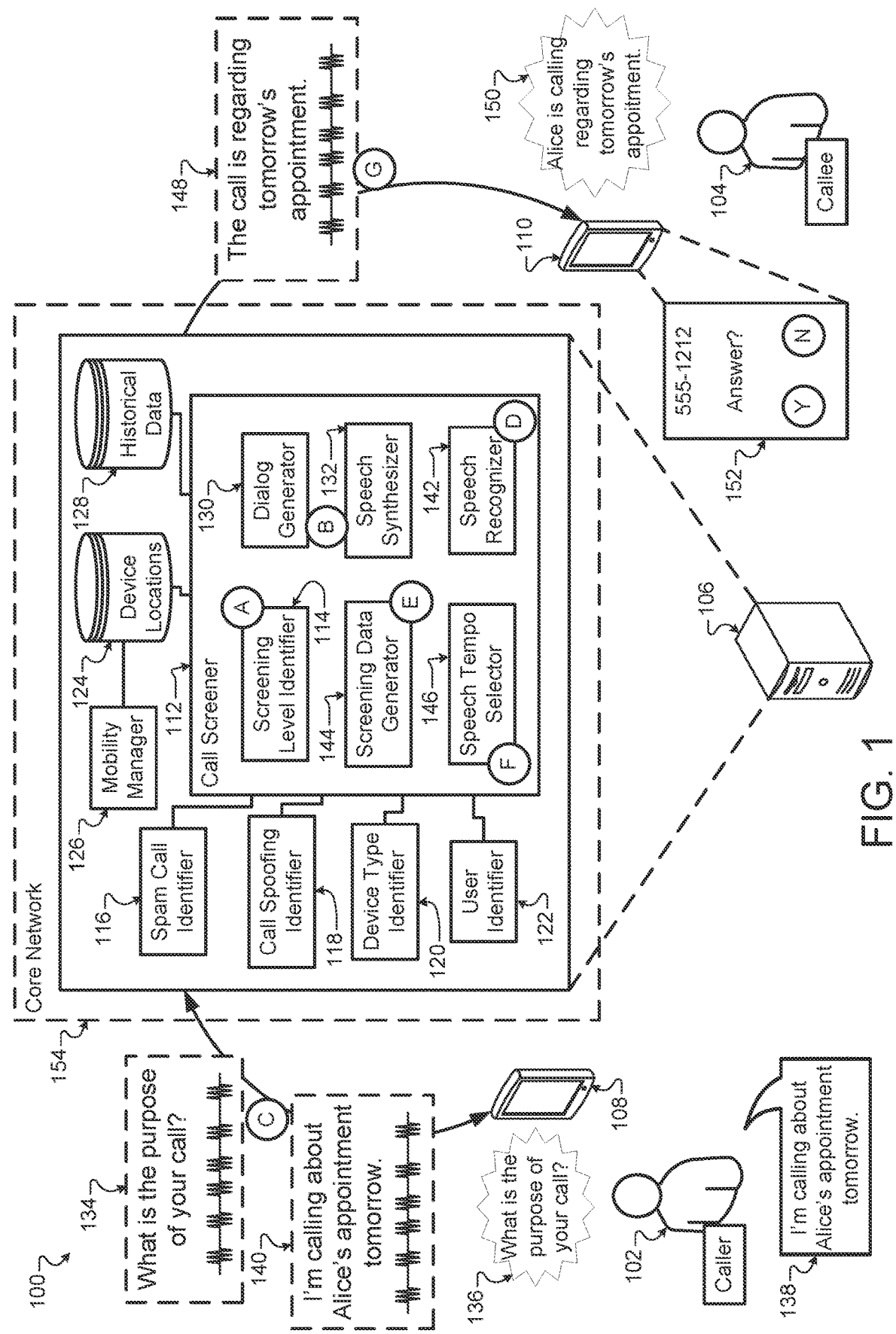
FIG. 1 illustrates an example system that is configured to screen telephone calls at various screening levels based on the characteristics of the telephone call.

Spam telephone calls can be a source of frustration for users and service providers. A user may be interrupted by a ringing telephone. After answering the telephone call, the user may realize that the telephone call is spam and promptly end the telephone call. Without data to identify spam telephone calls from other telephone calls, the service provider may be connecting many spam telephone calls each day. Even if the spam telephone calls are a small fraction of the overall traffic managed by a service provider, the amount of resources used to receive, route, and terminate spam telephone calls can be significant for service providers that handle billions of telephone calls each day.

In order for a service provider to more effectively identify spam telephone calls, it would be beneficial for a service provider to collect information on the caller. This information may be in addition to the phone number of the caller, the time of the phone call, and the location of the caller. The service provider may gather the additional information by screening the telephone calls either at the request of the called party, automatically in response to identifying a potential spam telephone call, or for all incoming calls. An automated call screener may collect information related to the reason for the call, the subject matter of any previous calls with the called party, and/or attempt to occupy the time of the caller to dissuade future calls. The automated call screener may provide the gathered information to the called party, and the called party may decide whether to take the call. In some implementations, the automated call screener may provide information to the called party at a faster speed to provide the calling party the perception that the called party is responding promptly.

The automated call screener may use a number of different factors to determine how to screen a potential spam telephone call. Some of those factors may include a confidence score that the incoming call is a spam telephone call, a confidence score that the phone number of the calling party is spoofed, the calling history of the calling party, whether the calling party is included in the contact list of the called party, and/or a location of the calling party. For example, the automated call screener may use a higher level of screening if the confidence score that the incoming call is a spam telephone call is above a threshold and the calling history of the calling party indicates that the calling party has placed a number of telephone calls in the last 24 hours that is above a threshold. As another example, the automated call screener may use a lower level of screening if the calling party has no calling history. The level of screening may relate to the type of questions asked by the automated call screener and/or the amount of time that the automated call screener attempts to ask questions. In some instances, if the automated call screener determines that the telephone call is likely spam, then the automated call screener may attempt to maximize the time with the caller and not notify the caller of the telephone call.

FIG. 1 illustrates an example system 100 that is configured to screen telephone calls at various screening levels based on the characteristics of the telephone call. Briefly, and as described in more detail below, the system 100 includes a server 106 that is configured to screen telephone calls. The server 106 may screen telephone calls at different levels of screening depending on who is calling, whether the telephone call is likely a spam telephone call, the calling history between the caller 102 and the callee 104, and/or other additional factors. Depending on the level of screening, the server 106 may ask the caller 102 different types of questions and/or may attempt to prolong the screening process for at least a period of time. The server 106 provides screening data to the callee 104 based on caller's answers to the screening questions. FIG. 1 includes various stages A through G that may illustrate the performance of actions and/or the movement of data between various components of the server 106 and/or between the server 106 and other computing devices. The system 100 may perform these stages in any order.

In more detail, the caller 102 may place a telephone call to the callee 104. The caller 102 may be using the computing device 108 that is configured to place telephone calls. The computing device 108 may be a mobile phone, landline phone, laptop computer, tablet, desktop computer, smart watch, or any other similar device that is configured to place telephone calls. The server 106 may route the telephone call to the computing device 110 of the callee 104. The computing device 110 may be any type of computing device that is configured to receive a telephone call. For example, the computing device 110 may be a mobile phone, landline phone, laptop computer, tablet, desktop computer, smart watch, or any other similar device. In some instances, the caller 102 may be an automated caller such that a person is not placing the telephone call, but rather a computer.

The server 106 may include a call screener 112 that is configured to screen telephone calls. The call screener 112 may screen incoming telephone calls for the callee 104 according to settings provided by the callee 104. For example, the call screener 112 may screen all incoming telephone calls for the callee 104, none of the incoming telephone calls for the callee 104, and/or telephone calls that fit other criteria. Some of the other criteria may be related to the location of the computing devices 108 and 110, previous communications between the caller 102 and the callee 104, previous communications of the caller 102, previous communications of the callee 104, the likelihood that the telephone call is a spam telephone call, the likelihood that the telephone number of the telephone call is a spoofed telephone number, the type of device of the computing devices 108 and 110, the identity of the caller 102 and callee 104, and/or any other similar factors.

The server 106 may be included in or in communication with a network such as a wireless carrier network that provides voice and data communication services to multiple devices, such as the computing devices 108 and 110 and other devices. The wireless carrier network may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), 5th Generation (5G) wireless systems, CDMA-2000 (Code Division Multiple Access 2000), and/or other similar standards. In some implementations, the server 106 may communicate with the computing devices 108 and 110 and other devices using a Wi-Fi network, short range radio, infrared communication, and/or any other similar communication technique.

The wireless carrier network may include a radio access network and a core network 154. The radio access network may include multiple base stations. The multiple base stations are responsible for handling voice and/or data traffic between multiple devices, such as the com computing devices 108 and 110 and other devices and the core network 154. Accordingly, each of the base stations may provide a corresponding network cell that delivers telecommunication and data communication coverage. The core network 154 may use the network cells to provide communication services to the multiple subscriber devices. For example, the core network 154 may connect the multiple devices to other telecommunication and data communication networks, such as the Internet and the public switched telephone network (PSTN). The base stations are responsible handling voice and data traffic between devices and the core network 154. In some implementations, the base stations may be in the form of eNodeB nodes. Each eNodeB node may include a base transceiver system (BTS) that communicates via an antenna system over an air-link with one or more devices that are within range. The antenna system of an eNodeB node may include multiple antennas that are mounted on a radio tower to provide a coverage area that is referred to as a "cell." The BTS may send radio signals to devices and receive radio signals from devices.

The caller 102 may place a telephone call to the computing device 110 of the callee 104. The server 106 may receive the telephone call, and the call screener 112 may determine whether to screen the telephone call. The call screener 112 may include a screening level identifier 114. The screening level identifier 114 may be configured to determine a level of screening to apply to an incoming telephone call. The screening level identifier 114 may determine the screening level based on various characteristics of the telephone call. The lowest level of screening may be to not screen the telephone call. The highest level of screening may be to block the telephone call and/or send the telephone call to the voicemail system. There may be various levels of screening in between the lowest screening level and the highest screening level. The various screening levels may be related to the questions asked during the screening process, the length of time of the screening process, and/or any other similar part of the screening process.

In stage A, the screening level identifier 114 may determine the level of screening to apply to the incoming telephone call from the computing device 108. The screening level identifier 114 may determine the level of screening to apply to the incoming telephone call based on various characteristics of the incoming telephone call. The various characteristics may include the location of the computing devices 108 and 110, previous communications between the caller 102 and the callee 104, previous communications of the caller 102, previous communications of the callee 104, the likelihood that the telephone call is a spam telephone call, the likelihood that the telephone number of the telephone call is a spoofed telephone number, the type of device of the computing devices 108 and 110, the identity of the caller 102 and callee 104, and/or any other similar factors.

The screening level identifier 114 may access location data from the device locations 124. The device locations 124 may include data related to the current location of the computing devices 108 and 110. The server 106 may include a mobility manager 126 that is configured to store the location data in the device locations 124. The mobility manager 126 may be configured to monitor the location of the computing devices 108 and 110 that are connected to the server 106 through a wireless base station. The location of the computing devices 108 and 110 may include the location of the wireless base station to which the computing devices 108 and 110 are connected and/or GPS data received from the computing devices 108 and 110.

In some implementations, the mobility manager 126 may determine the location of computing devices 108 and 110 at periodic intervals, such as every five seconds. In some implementations, the mobility manager 126 may determine the location of a computing devices 108 and 110 when the computing devices 108 and 110 connect to a different wireless base station and/or provide updated GPS data. In some implementations, the mobility manager 126 may determine the location of the computing devices 108 and 110 relative to the base station with which the computing device is communicating. In this case, the mobility manager 126 may determine the relative location based on data collected from the base station such as signal strength and direction of communications between the computing devices 108 and 110 and the base station. The mobility manager 126 may also determine the relative location based on the location of the base station and GPS data received from the computing devices 108 and 110. The relative location data may include a distance between the computing devices 108 and 110 and the base station, the cardinal direction from the base station to the computing devices 108 and 110, and/or any other similar measurements.

The screening level identifier 114 may access identity data from a user identifier 122. The server 106 may include the user identifier 122. The user identifier 122 may be configured to determine the identify of the users 102 and/or 104 and provide the identity data to the screening level identifier 114. In some instances, the computing devices 108 and/or 110 may be associated with a particular user and/or entity. Each user may be associated with various demographic data such as age, gender, and/or other demographic information. The user identifier 122 may provide identity data and/or demographic data to the screening level identifier 114 based on the user data associated with the computing devices 108 and/or 110. In some instances, the user identifier 122 may provide data classifying the caller 108 and/or callee 110. For example, the user identifier 122 may provide an age range of the caller 102 and/or callee 104 to the screening level identifier 114. In some implementations, the user identifier 122 may provide data indicating whether the computing devices 108 and/or 110 are included in the same account with the wireless carrier, as may be the case for the computing devices of each person who are part of the same household. In some implementations, the user identifier 122 may provide data identifying an account owner of the account of the phone number of the computing devices 108 and/or 110. In some implementations, the user identifier 122 may not have access to identity data for the caller 108 and/or callee 110. In this case, the user identifier 122 may not provide identity data to the screening level identifier 114 or may provide the phone number of the computing devices 108 and/or 110 to the screening level identifier 114.

The screening level identifier 114 may access device type data from the device type identifier 120. The device type data may indicate a type of computing device of the computing devices 108 and/or 110. The server 106 may include the device type identifier 120 that provides the device type data. The device type identifier 120 may be configured to identify a type of device that initiated the telephone call and a type of device that is to receive the telephone call. In some instances, the computing devices 108 and/or 110 may be associated with a phone number. In this case, the device type identifier 120 may access data that relates a phone number to the type of equipment associated with that phone number. In some instances, the computing devices 108 and/or 110 may be associated with a unique identifier such as an international mobile subscriber identity, media access control address, and/or another similar identifier. In this case the device type identifier 120 may access data that relates the unique identifier to the type of equipment associated with that identifier. The device type identifier 120 may provide data identifying the device types of the computing devices 108 and/or 110 to the screening level identifier 114.

The screening level identifier 114 may access spam call data from the spam call identifier 116 of the server 106. The spam call identifier 116 may be configured to determine a likelihood that the telephone call from the caller 102 is a spam telephone call. In some implementations, the spam call identifier 116 may determine a confidence score that reflects the likelihood that the telephone call from the caller 102 is a spam telephone call. For example, the spam call identifier 116 may determine a confidence score of 0.8 indicating an eighty percent likelihood that the telephone call is a spam telephone call.

The spam call identifier 116 may analyze the device type data from the device type identifier, the identity data from the user identifier 122, the location data from the device locations 124, the historical data 128, and/or any other similar information to determine the likelihood that the telephone call from the caller 102 is a spam telephone call. The historical data 128 may include data related to previous telephone calls of the caller 102, the callee 204, the computing device 108, the computing device 110, and/or any other users and/or computing devices. The historical data 128 may include a date, time, and/or the duration of previous telephone calls. The historical data 128 may include data indicating whether the called party answered the telephone call, whether the voicemail system answered the telephone call, and/or whether the calling party left a voicemail. The historical data 128 may also include data identifying the calling party and data identifying the called party. The data identifying the calling party may include a phone number of the calling party, a name of the calling party, a geographic location of the calling party at the time of the call, a network location of the calling party at the time of the call, data identifying a computing device used by the calling party, and/or any other similar information of the calling party. The data identifying the called party may include a phone number of the called party, a name of the called party, a geographic location of the called party at the time of the call, a network location of the called party at the time of the call, data identifying a computing device used by the called party and/or any other similar information of the called party.

The spam call identifier 116 may use a combination of rules and/or models to analyze the device type data, the identity data, the location data, the historical data 128, and/or other data to determine whether the telephone call is likely a spam telephone call. For example, the spam call identifier 128 may use a rule that specifies that the telephone call is likely a spam telephone call if the called party has not received a call from the phone number during the past year, the duration of the telephone call was less than one minute, and the called party ended the telephone call. This rule may be configured to identify telephone calls where the called party likely hung up the telephone after determining that the telephone call was a spam telephone call. This rule may also identify non-spam telephone calls where the calling party dialed a wrong number or wanted to verify that the number is active. Because of this, it may be beneficial to use additional rules and/or models to identify likely spam telephone calls. As another example, the spam call identifier 116 may determine that the telephone call is likely not a spam telephone call if the duration of previous telephone calls between caller 102 and the callee 104 were greater than ten minutes.

The models that the spam call identifier 116 may use to determine whether the telephone call is likely a spam telephone call may include models trained using machine learning and the historical data 128. The models may be configured to receive data related to the telephone call and output data indicating whether the telephone call is likely a spam telephone call or not likely a spam telephone call. In some implementations, a model may be configured to output a confidence score that indicates a likelihood that the output of the model is accurate. An example model may be configured to receive, for a telephone call, the date, time, phone number of the called party, phone number of the calling party, and data identifying the device used by the calling party. The model may output data indicating whether that telephone call is likely a spam telephone call or not likely a spam telephone call.

The screening level identifier 114 may access spoof call data from the call spoofing identifier 118 of the server 106. The call spoofing identifier 118 may be configured to determine a likelihood that the telephone call from the caller 102 is a spoofed telephone call. In some implementations, the call spoofing identifier 118 may determine a confidence score that reflects the likelihood that the telephone call from the caller 102 is a spoofed telephone call. For example, the call spoofing identifier 118 may determine a confidence score of 0.4 indicating a forty percent likelihood that the telephone call is a spoofed telephone call. A telephone call may be spoofed if the phone number that the computing device 108 is different than the phone number used to call the computing device 108. This may occur if the caller 102 is intending to mislead the callee 104 by having the caller identification displayed on the computing device 110 being a phone number that the callee 104 may be more likely to answer.

The call spoofing identifier 118 may analyze the device type data from the device type identifier, the identity data from the user identifier 122, the location data from the device locations 124, the historical data 128, and/or any other similar information to determine the likelihood that the telephone call from the caller 102 is a spoofed telephone call. The call spoofing identifier 118 may use a combination of rules and/or models to analyze the device type data, the identity data, the location data, the historical data 128, and/or other data to determine whether the telephone call is likely a spam telephone call. For example, the call spoofing identifier 118 may use a rule that specifies that the telephone call is likely a spoofed telephone call if the called party is calling from a location that does not match the area code of the telephone number. As another example, the call spoofing identifier 118 may determine that the telephone call is likely not a spoofed telephone call if there was a communication between the computing device 108 and the computing device 110 that was greater than ten minutes within the past seven days.

The models that the call spoofing identifier 118 may use to determine whether the telephone call is likely a spoofed telephone call may include models trained using machine learning and the historical data 128. The models may be configured to receive data related to the telephone call and output data indicating whether the telephone call is likely a spoofed telephone call or not likely a spoofed telephone call. In some implementations, a model may be configured to output a confidence score that indicates a likelihood that the output of the model is accurate. An example model may be configured to receive, for a telephone call, the date, time, phone number of the called party, phone number of the calling party, and data identifying the device used by the calling party. The model may output data indicating whether that telephone call is likely a spoofed telephone call or not likely a spoofed telephone call.

The screening level identifier 114 may analyze the location data, the historical data 128, the spam call data, the spoofed call data, the device type data, the identity data, and/or any other data to determine a level of screening to apply to the telephone call from the caller 102. The screening level identifier 114 may use models and/or rules to analyze this data. The rules may specify how to compare the location data, the historical data 128, the spam call data, the spoofed call data, the device type data, the identity data, and/or any other data to determine the screening level. The models may be configured to receive the location data, the historical data 128, the spam call data, the spoofed call data, the device type data, the identity data, and/or any other data and output data indicating the screening level. The models may be trained using machine learning and historical data.

The screening level may be a numerical value where zero indicates to allow the telephone call to ring the computing device 110 and one indicates to block the telephone call or send the telephone call to the voicemail system. A screening level between zero and one may indicate a minimum time period for the screening and/or the types of data that the call screener 112 should attempt to determine. For example, a screening level of 0.2 may indicate a minimum time period of twenty seconds and to determine the name of the caller 102 and the purpose of the telephone call. A screening level of 0.6 may indicate a minimum time period of sixty seconds and to determine the name of the caller 102, the purpose of the telephone call, the last time the caller 102 talked to the callee 104 on the phone, and the subject of the previous call between the caller 102 and the callee 104.

The screening level identifier 114 may use rules and/or models to determine a screening level to apply to the telephone call. An example rule may indicate to determine a screening level of 0.1 if the spam call confidence score is less than 0.3, the spoof call confidence score is less than 0.3, and the callee 104 previously communicated with the caller 102 within the last seven days for at least five minutes. Another example rule may indicate to determine a screening level of 0.8 if the spam call confidence score is greater than 0.7 or the spoof call confidence score is greater than 0.7. Another example rule may indicate to determine a screening level of 0.5 if the callee 104 previously communicated with the caller 102 within the last thirty days for at least one minute. There may be some instances where different rules may specify different screening levels. In this case, the screening level identifier 114 may average the screening levels from the various rules. In some instances, the rules may be ranked such that the screening level identifier 114 determines the screening level based on the highest ranked rule that specifies a screening level.

A model may be configured to receive the location data, the historical data 128, the spam call data, the spoofed call data, the device type data, the identity data, and/or any other data and output data indicating the screening level. The screening level identifier 114 may select a model depending on the data that the screening level identifier 114 receives. For example, if the screening level identifier 114 receives the spoofed call data, the device type data, and the identity data, then the screening level identifier 114 may select a model that is configured to receive that data and output data indicating the screening level. If the screening level identifier 114 receives the spam call data, the spoofed call data, and the identity data, then the screening level identifier 114 may select a model that is configured to receive that data and output data indicating the screening level.

In stage B, the screening level identifier 114 may provide the screening level to the dialog generator 130. The dialog generator 130 may be configured to generate lines of dialog to output to the caller 102 based on the screening level. As noted above, the screening level may correspond to the types of data that the call screener 112 should attempt to gather from caller 102. Some screening levels may specify to collect the name of the caller 102 and the purpose of the telephone call. Other screening levels may specify to collect the name of the caller 102, the purpose of the telephone call, and the business purpose of an entity that the caller 102 represents. Another screening level may specify to collect the purpose of the telephone call.

Based on the screening level, the dialog generator 130 may determine the information that the call screener 112 should attempt to collect. The screening level may also specify a minimum amount of time that the call screener 112 should screen the caller 102. Based on the information that the call screener 112 should attempt to collect, the dialog generator 130 may generate dialog to collect that information. For example, if the call screener 112 should collect the name of the caller 102, then the dialog generator 130 may generate the dialog, "Please state your name." As another example, if the call screener 112 should collect information on the last time that the caller 102 communicated with the callee 104, then the dialog generator 130 may generate the dialog, "What did you last discuss with the person you are calling?" In the example of FIG. 1, the screening level may indicate to collect information on the purpose of the telephone call. The dialog generator 130 may generate the dialog, "What is the purpose of your call?"

The dialog generator 130 may provide the dialog to the speech synthesizer 132. The speech synthesizer 132 may be configured to generate speech audio of received text. The speech synthesizer 132 may generate speech audio of dialog lines received from the dialog generator 132. In some implementations, the speech synthesizer 132 may generate speech audio using different voices. In this case, the user 104 may select the voice for the speech synthesizer 132 to use during the screening process. In the example of FIG. 1, the speech synthesizer 132 may generate speech audio 134 of the dialog, "What is the purpose of your call?"

In stage C, the server 106 may provide the speech audio 134 to the computing device 108. The computing device 108 may receive the speech audio 134 and output the speech audio 134 through a speaker of the computing device 108. The caller 102 may hear the audio 136 of the synthesized speech dialog. For example, the caller 102 may hear the audio 136 of "What is the purpose of your call?" The caller 102 may response with the utterance 138. The microphone of the computing device 108 may detect the utterance 138 and generate the speech audio 140 of the utterance 138. The computing device 108 may transmit the speech audio 140 to the server 106. For example, the caller 102 may speak the utterance 138 of, "I'm calling about Alice's appointment tomorrow." A microphone of the computing device 108 may detect the utterance 138 and generate the speech audio 140 that encodes the utterance of, "I'm calling about Alice's appointment tomorrow." The computing device 108 may transmit the speech audio 140 to the server 106.

The call screener 112 may include a speech recognizer 142 that is configured to generate a transcription of speech audio. In stage D, the speech recognizer 142 may receive the speech audio 140 and generate the transcription, "I'm calling about Alice's appointment tomorrow." The speech recognizer 142 may provide the transcription of the speech audio 140 to the screening data generator 144. In stage E, the screening data generator 144 may analyze the transcription of the speech audio 140, the screening level from the screening level identifier 144, and the information that the dialog generator 130 attempted to collect with the dialog of the speech audio 134. The screening data generator 144 may determine that the transcription of the speech audio 140 includes the information that the dialog generator 130 attempted to collect with the dialog of the speech audio 134. The screening data generator 144 may generate screening data that includes information from the transcription of the speech audio 140.

The screening data generator 144 may make various determinations based on analyzing the transcription of the speech audio 140, the screening level from the screening level identifier 144, and the information that the dialog generator 130 attempted to collect with the dialog of the speech audio 134. A first determination may be that the transcription of the speech audio 140 includes the information that the dialog generator 130 attempted to collect. In this case, the screening data generator 144 may generate screening data that includes information from the transcription of the speech audio 140 and determine whether there are additional portions of information to collect based on the screening level from the screening level identifier 144. In some instances, the screening data generator 144 may determine that there are no additional portions of information to collect. In this case, the screening data generator 144 may output the screening data that includes the information that the dialog generator 130 attempted to collect. In some instances, the screening data generator 144 may determine that there are additional portions of information to collect. In this case, the screening data generator 144 may provide, to the dialog generator 130 an indication that some information was successfully collected from the caller 102. The dialog generator 130 may generate new dialog to attempt to collect the additional information according to the screening level.

A second determination of the screening data generator 144 may be that the transcription of the speech audio 140 does not include the information that the dialog generator 130 attempted to collect. In this case, the screening data generator 144 may provide an indication to the dialog generator 130 that the information collection was not successful. In this case, the dialog generator 130 may generate additional dialog that attempts to collect the same information. The dialog generator 130 may generate additional dialog that requests the information in a different manner and/or that includes a response to the information in the audio data 140 of the utterance 138 spoken by the caller 102. The dialog generator 130 may provide the additional dialog to the speech synthesizer 132, and the speech recognizer 142 and screening data generator 144 may analyze the response of the caller 102.

A third determination of the screening data generator 144 may be that the transcription of the speech audio 140 does include the information that the dialog generator 130 attempted to collect and that there is no additional information to collect. However, the screening data generator 144 may determine that the minimum screening time has not elapsed. In this case, the screening data generator 144 may indicate to the dialog generator 130 to generate additional dialog. The additional dialog may be to collect information that may not be needed according to the screening level or may be to stall the screening process of the caller 102. For example, the screening data generator 144 may determine that the audio data 140 of the utterance 138 includes the information specified by the screening level. The screening data generator 144 may determine that no additional information is required according to the screening level. The screening data generator 144 may determine that the time elapsed during the screening process is twenty seconds, which may be less than the time specified by the screening level of forty seconds. The screening data generator 144 may indicate to the dialog generator 130 to generate additional dialog without the goal of collecting specific information. The dialog generator 130 may generate the dialog of, "What's the name of your company?" or "Have you previously called the callee?" The dialog generator 130 may not be attempting to collect any information. Instead, the dialog generator 130 may be attempting to extend the time of the call screening. In some instances, the screening data generator 144 may include any additional information collected from the caller 102 in the screening data, even if the screening level did not indicate to collect the additional information.

With the screening data generated, the screening data generator 144 may provide the screening data to the speech synthesizer 132. The screening data may be a textual summary of the information collected from the caller 102. For example, the screening data generator 144 may generate the screening data summary, "The call is regarding tomorrow's appointment." The speech synthesizer 132 may generate speech audio 148 of the screening data summary. The speech synthesizer 132 may generate speech audio 148 such that the speech audio 148 has a tempo selected by the speech tempo selector 146. In stage F, the speech tempo selector 146 may instruct the speech synthesizer 132 to generate the speech audio 148 of the screening data summary at a standard tempo, such as one hundred-fifty words per minute. In some instances, the speech tempo selector 146 may instruct the speech synthesizer 132 to generate the speech audio 148 of the screening data summary at a faster tempo, such as two hundred words per minute. The speech tempo selector 146 may select a tempo based on the time elapsed during the screening process and the time specified by the screening level. For example, the time specified by the screening level may be thirty seconds, and the time elapsed by during the screening process may be one minute. In this case, the speech tempo selector 146 may select a speech tempo faster than the standard tempo. The faster speech tempo may be two-hundred fifty words per minute. As another example, the time specified by the screening level may be thirty seconds, and the time elapsed by during the screening process may be thirty seconds. In this case, the speech tempo selector 146 may select a standard speech tempo such as one hundred fifty words per minute. In some implementations, the callee 104 may specify a minimum speech tempo. In this case, the speech tempo selector 146 may select a speech tempo that is equal to or greater than the minimum speech tempo.

In stage G, the server 106 may provide the speech audio 148 of the screening data summary to the computing device 110. The computing device 110 may output the audio 150 through a speaker of the computing device 110. In some implementations, the computing device 110 may output the audio 150 at various points. For example, the computing device 110 may output the audio 150 after the callee 104 answers the telephone call and before being connected to the caller 102. The computing device 110 may output the audio 150 after the computing device 110 rings and before the callee 104 answers the telephone call. In some instances, the computing device 110 may output the audio 150 in response to the callee 104 saying something, such as, "hello." The computing device 110 may also generate and output the interface 152 that allows the callee 104 to answer the telephone call from the caller 102. The callee 104 may select "Y" from the interface 152 to be connected with the caller 102. The callee 104 may select "N" from the interface 152 and the caller 102 may be connected with the voicemail system.

Figure 2:
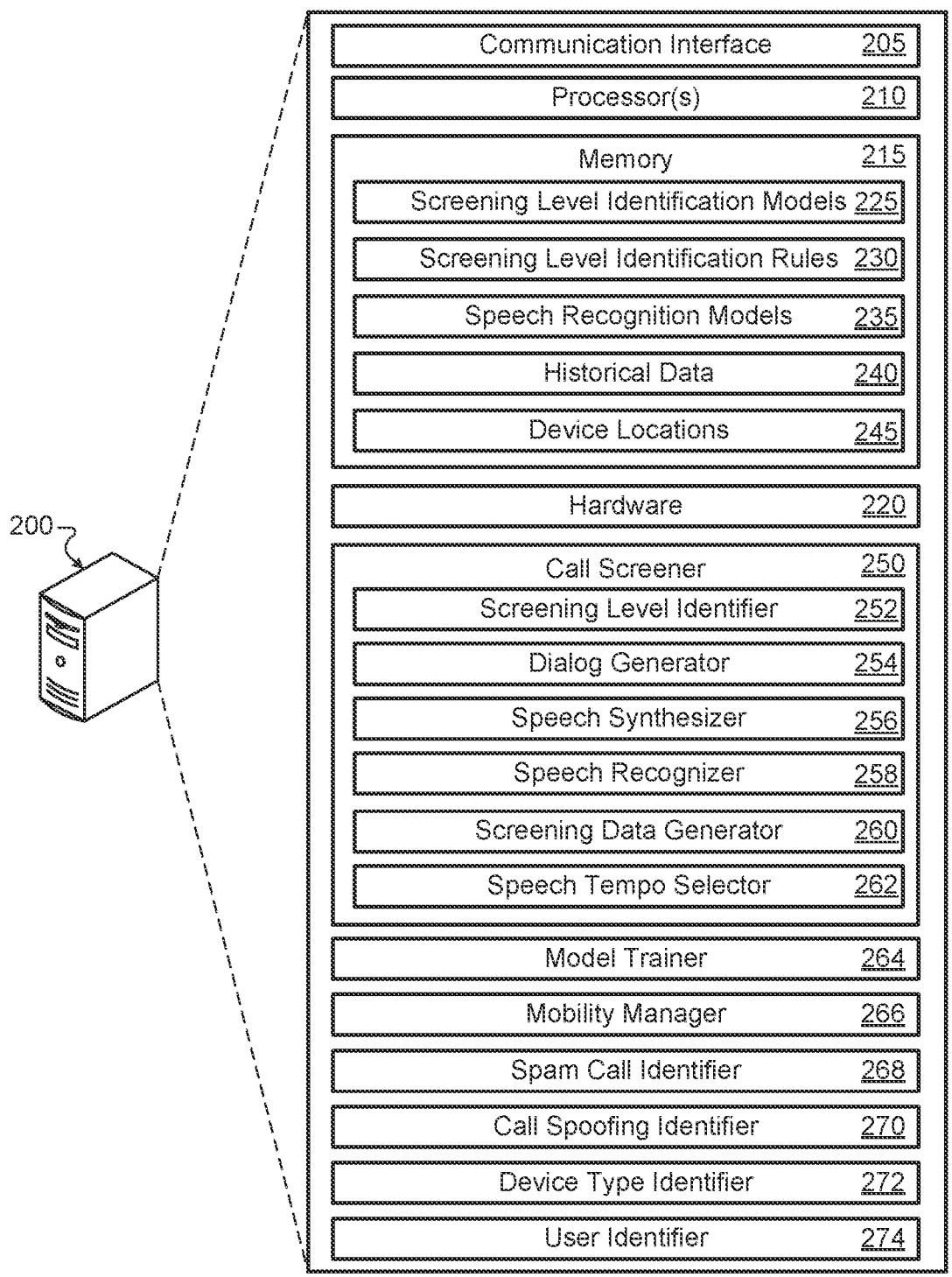
FIG. 2 illustrates an example server that is configured to screen telephone calls at various screening levels based on the characteristics of the telephone call.

FIG. 2 illustrates an example server 200 that is configured to screen telephone calls at various screening levels based on the characteristics of the telephone call. The server 200 may be any type of computing device that is configured to communicate with other computing devices. The server 200 may be integrated into a wireless carrier network or interact with a wireless carrier network. The server 200 may communicate with other computing devices using a wide area network, a local area network, the internet, a wired connection, a wireless connection, and/or any other type of network or connection. The wireless connections may include Wi-Fi, short-range radio, infrared, and/or any other wireless connection. The server 200 may be similar to the server 106 of FIG. 1. Some of the components of the server 200 may be implemented in a single computing device or distributed over multiple computing devices. Some of the components may be in the form of virtual machines or software containers that are hosted in a cloud in communication with disaggregated storage devices.

The server 200 may include a communication interface 205, one or more processors 210, memory 215, and hardware 220. The communication interface 205 may include communication components that enable the server 200 to transmit data and receive data from devices connected to the wireless carrier network. The communication interface 205 may include an interface that is configured to communicate with base stations of a wireless carrier network. The communication interface 205 may receive data that other devices transmit to the base stations and/or transmit data to the base stations for transmission to the other devices. In some implementations, the communication interface 205 may be configured to communicate using a wide area network, a local area network, the internet, a wired connection, a wireless connection, and/or any other type of network or connection. The wireless connections may include Wi-Fi, short-range radio, infrared, and/or any other wireless connection.

The hardware 220 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multi-media/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 210 may implement a call screener 250. The call screener 250 may be similar to the call screener 112 of FIG. 1. The call screener 250 may be configured to screen incoming telephone calls for a callee according to settings provided by the callee. For example, the call screener 250 may screen all incoming telephone calls for the callee, none of the incoming telephone calls for the callee, and/or telephone calls that fit other criteria. Some of the other criteria may be related to the locations of calling device and the called device, previous communications between the caller and the callee, previous communications of the caller, previous communications of the callee, the likelihood that the telephone call is a spam telephone call, the likelihood that the telephone number of the telephone call is a spoofed telephone number, the types of device of the calling device and the called device, the identity of the caller and callee, and/or any other similar factors.

The call screener 250 may include a screening level identifier 252. The one or more processors 210 may implement the screening level identifier 252. The screening level identifier 252 may be similar to the screening level identifier 114 of FIG. 1. The screening level identifier 252 may be configured to determine a level of screening to apply to an incoming telephone call. The screening level identifier 252 may determine the screening level based on various characteristics of the telephone call. The lowest level of screening may be to not screen the telephone call. The highest level of screening may be to block the telephone call and/or send the telephone call to the voicemail system. There may be various levels of screening in between the lowest screening level and the highest screening level. The various screening levels may be related to the questions asked during the screening process, the length of time of the screening process, and/or any other similar part of the screening process.

The screening level identifier 252 may determine the level of screening to apply to the incoming telephone call based on various characteristics of the incoming telephone call. The various characteristics may include the locations of the calling device and the called device, previous communications between the caller and the callee, previous communications of the caller, previous communications of the callee, the likelihood that the telephone call is a spam telephone call, the likelihood that the telephone number of the telephone call is a spoofed telephone number, the type of devices of the calling device and the called device, the identity of the caller and callee, and/or any other similar factors.

The screening level identifier 252 may access the location data of the calling device and the called device from the device locations 245. The device locations 245 may include data related to the current location of the of the calling device and the called device. The mobility manager 266 may monitor the locations of the calling device and the called device and other computing device communicating with the server 200. The one or more processors 210 may implement the mobility manager 266. The mobility manager 266 may be similar to the mobility manager 126 of FIG. 1. The mobility manager 266 may be configured to monitor the location of a computing device that is connected to the server 200 through a wireless base station. The location of the computing device may include the location of the wireless base station to which the computing device is connected and/or GPS data received from the computing device.

In some implementations, the mobility manager 266 may determine the location of a computing device at periodic intervals, such as every five seconds. In some implementations, the mobility manager 266 may determine the location of a computing device when the computing device connects to a different wireless base station and/or provides updated GPS data. In some implementations, the mobility manager 266 may determine the location of the computing device relative to the base station with which the computing device is communicating. In this case, the mobility manager 266 may determine the relative location based on data collected from the base station such as signal strength and direction of communications between the computing device and the base station. The mobility manager 266 may also determine the relative location based on the location of the base station and GPS data received from the computing device. The relative location data may include a distance between the computing device and the base station, the cardinal direction from the base station to the subscriber device, and/or any other similar measurements.

The screening level identifier 252 may access identity data from the user identifier 274. The one or more processors 210 may implement the user identifier 274. The user identifier 274 may be similar to the user identifier 122 of FIG. 1. The user identifier 274 may be configured to determine the identity of the caller and the callee and provide the identity data to the screening level identifier 252. In some instances, the calling device and the called device may be associated with a particular user and/or entity. Each user may be associated with various demographic data such as age, gender, and/or other demographic information. The user identifier 274 may provide identity data and/or demographic data to the screening level identifier 252 based on the user data associated with the calling device and the called device. In some instances, the user identifier 274 may provide data classifying the caller and/or callee. For example, the user identifier 274 may provide an age range of the caller and/or callee to the screening level identifier 252. In some implementations, the user identifier 274 may provide data indicating whether the calling device and/or the called device are included in the same account with the wireless carrier, as may be the case for the computing devices of each person who are part of the same household. In some implementations, the user identifier 274 may provide data identifying an account owner of the account of the phone number of the calling device and/or calling device. In some implementations, the user identifier 274 may not have access to identity data for the caller and/or callee. In this case, the user identifier 274 may not provide identity data to the screening level identifier 252 or may provide the phone number of the calling device and/or called device to the screening level identifier 252.

The screening level identifier 252 may access device type data from the device type identifier 272. The device type data may indicate a type of computing device of the calling device and/or the called device. The one or more processors 210 may implement the device type identifier 272. The device type identifier 272 may be similar to the device type identifier 120 of FIG. 1. The device type identifier 272 may be configured to identify a type of device that initiated the telephone call and a type of device that is to receive the telephone call. In some instances, the calling device and/or the called device may be associated with a phone number. In this case, the device type identifier 272 may access data that relates a phone number to the type of equipment associated with that phone number. In some instances, the calling device and/or the called device may be associated with a unique identifier such as an international mobile subscriber identity, media access control address, and/or another similar identifier. In this case the device type identifier 272 may access data that relates the unique identifier to the type of equipment associated with that identifier. The device type identifier 272 may provide data identifying the device types of the calling device and/or the called device to the screening level identifier 252.

The screening level identifier 252 may access spam call data from the spam call identifier 268 of the server 106. The one or more processors 210 may implement the spam call identifier 268. The spam call identifier 268 may be similar to the spam call identifier 116 of FIG. 1. The spam call identifier 268 may be configured to determine a likelihood that the telephone call from the caller is a spam telephone call. In some implementations, the spam call identifier 268 may determine a confidence score that reflects the likelihood that the telephone call from the caller is a spam telephone call. For example, the spam call identifier 268 may determine a confidence score of 0.8 indicating an eighty percent likelihood that the telephone call is a spam telephone call.

The spam call identifier 268 may analyze the device type data from the device type identifier, the identity data from the user identifier 274, the location data from the device locations 245, the historical data 240, and/or any other similar information to determine the likelihood that the telephone call from the caller is a spam telephone call. The historical data 240 may include data related to previous telephone calls of the caller, the callee, the calling device, the called device, and/or any other users and/or computing devices. The historical data 240 may include a date, time, and/or the duration of previous telephone calls. The historical data may include transcriptions of the previous telephone calls and these transcriptions may include timestamps that indicate an amount of time that elapsed during the call at various points in the transcriptions. The historical data 240 may include data indicating whether the called party answered the telephone call, whether the voicemail system answered the telephone call, and/or whether the calling party left a voicemail. The historical data 240 may include spam confidence scores that indicate a likelihood that the corresponding call was likely a spam telephone call. The historical data 240 may include spoof confidence scores that indicate a likelihood that the corresponding call was likely from a spoofed telephone number. The historical data 240 may also include data identifying the calling party and data identifying the called party. The data identifying the calling party may include a phone number of the calling party, a name of the calling party, a geographic location of the calling party at the time of the call, a network location of the calling party at the time of the call, data identifying a computing device used by the calling party, and/or any other similar information of the calling party. The data identifying the called party may include a phone number of the called party, a name of the called party, a geographic location of the called party at the time of the call, a network location of the called party at the time of the call, data identifying a computing device used by the called party and/or any other similar information of the called party.

The spam call identifier 268 may use a combination of rules and/or models to analyze the device type data, the identity data, the location data, the historical data 240, and/or other data to determine whether the telephone call is likely a spam telephone call. For example, the spam call identifier 268 may use a rule that specifies that the telephone call is likely a spam telephone call if the called party has not received a call from the phone number during the past year, the duration of the telephone call was less than one minute, and the called party ended the telephone call. This rule may be configured to identify telephone calls where the called party likely hung up the telephone after determining that the telephone call was a spam telephone call. This rule may also identify non-spam telephone calls where the calling party dialed a wrong number, and probing techniques for spammers who wanted to verify whether the number is active by seeing if a person answered or if voicemail picked up. Because of this, it may be beneficial to use additional rules and/or models to identify likely spam telephone calls. As another example, the spam call identifier 268 may determine that the telephone call is likely not a spam telephone call if the duration of previous telephone calls between caller and the callee were greater than ten minutes.

The models that the spam call identifier 268 may use to determine whether the telephone call is likely a spam telephone call may include models trained using machine learning and the historical data 240. The models may be configured to receive data related to the telephone call and output data indicating whether the telephone call is likely a spam telephone call or not likely a spam telephone call. In some implementations, a model may be configured to output a confidence score that indicates a likelihood that the output of the model is accurate. An example model may be configured to receive, for a telephone call, the date, time, phone number of the called party, phone number of the calling party, and data identifying the device used by the calling party. The model may output data indicating whether that telephone call is likely a spam telephone call or not likely a spam telephone call.

The screening level identifier 252 may access spoof call data from the call spoofing identifier 270 of the server 106. The one or more processors 210 may implement the call spoofing identifier 270. The call spoofing identifier 270 may be similar to the call spoofing identifier 118 of FIG. 1. The call spoofing identifier 270 may be configured to determine a likelihood that the telephone call from the caller is a spoofed telephone call. In some implementations, the call spoofing identifier 270 may determine a confidence score that reflects the likelihood that the telephone call from the caller is a spoofed telephone call. For example, the call spoofing identifier 270 may determine a confidence score of 0.4 indicating a forty percent likelihood that the telephone call is a spoofed telephone call. A telephone call may be spoofed if the phone number that the computing device 108 is different than the phone number used to call the calling device. This may occur if the caller is intending to mislead the callee by having the caller identification displayed on the called device being a phone number that the callee may be more likely to answer.

The call spoofing identifier 270 may analyze the device type data from the device type identifier, the identity data from the user identifier 275, the location data from the device locations 245, the historical data 240, and/or any other similar information to determine the likelihood that the telephone call from the caller is a spoofed telephone call. The call spoofing identifier 270 may use a combination of rules and/or models to analyze the device type data, the identity data, the location data, the historical data 240, and/or other data to determine whether the telephone call is likely a spam telephone call. For example, the call spoofing identifier 270 may use a rule that specifies that the telephone call is likely a spoofed telephone call if the called party is calling from a location that does not match the area code of the telephone number. As another example, the call spoofing identifier 270 may determine that the telephone call is likely not a spoofed telephone call if there was a communication between the calling device and the called device that was greater than ten minutes within the past seven days.

The models that the call spoofing identifier 270 may use to determine whether the telephone call is likely a spoofed telephone call may include models trained using machine learning and the historical data 240. The models may be configured to receive data related to the telephone call and output data indicating whether the telephone call is likely a spoofed telephone call or not likely a spoofed telephone call. In some implementations, a model may be configured to output a confidence score that indicates a likelihood that the output of the model is accurate. An example model may be configured to receive, for a telephone call, the date, time, phone number of the called party, phone number of the calling party, and data identifying the device used by the calling party. The model may output data indicating whether that telephone call is likely a spoofed telephone call or not likely a spoofed telephone call.

The screening level identifier 252 may analyze the location data, the historical data 240, the spam call data, the spoofed call data, the device type data, the identity data, and/or any other data to determine a level of screening to apply to the telephone call from the caller. The screening level identifier 252 may use the screening level identification models 225 and/or the screening level identification rules 230 to analyze this data. The screening level identification rules 230 may specify how to compare the location data, the historical data 240, the spam call data, the spoofed call data, the device type data, the identity data, and/or any other data to determine the screening level. The screening level identification models 225 may be configured to receive the location data, the historical data 240, the spam call data, the spoofed call data, the device type data, the identity data, and/or any other data and output data indicating the screening level. The model trainer 264 may train the screening level identification models 225 using machine learning and the historical data 240 and may generate the screening level identification rules 230 by identifying patterns in the historical data 240.

The screening level may be a numerical value where zero indicates to allow the telephone call to ring the called device and one indicates to block the telephone call or send the telephone call to the voicemail system. A screening level between zero and one may indicate a minimum time period for the screening and/or the types of data that the call screener 250 should attempt to determine. For example, a screening level of 0.2 may indicate a minimum time period of twenty seconds and to determine the name of the caller and the purpose of the telephone call. A screening level of 0.6 may indicate a minimum time period of sixty seconds and to determine the name of the caller, the purpose of the telephone call, the last time the caller talked to the callee on the phone, and the subject of the previous call between the caller and the callee.

The screening level identifier 252 may use the screening level identification rules 230 and/or the screening level identification models 225 to determine a screening level to apply to the telephone call. An example rule may indicate to determine a screening level of 0.1 if the spam call confidence score is less than 0.3, the spoof call confidence score is less than 0.3, and the callee previously communicated with the caller within the last seven days for at least five minutes. Another example rule may indicate to determine a screening level of 0.8 if the spam call confidence score is greater than 0.7 or the spoof call confidence score is greater than 0.7. Another example rule may indicate to determine a screening level of 0.5 if the callee previously communicated with the caller within the last thirty days for at least one minute. There may be some instances where different rules may specify different screening levels. In this case, the screening level identifier 252 may average the screening levels from the various rules. In some instances, the rules may be ranked such that the screening level identifier 252 determines the screening level based on the highest ranked rule that specifies a screening level.

The one or more processors may implement the model trainer 264. The model trainer 264 may be configured to generate the screening level identification rules 230 by identifying patterns and trends in the historical data 240. Based on those patterns and trends, the model trainer 264 may generate response generation rules that specify a screening level if certain conditions are met for the location data, the historical data 240, the spam call data, the spoofed call data, the device type data, the identity data, and/or any other data. For example, the model trainer 264 may analyze conversations between a caller with a certain phone number and various callees. The conversations may be included in the historical data 240. The model trainer 264 may determine the questions that a majority of the callees ask the caller, which may occur in the first thirty seconds. In this case, the model trainer 264 may generate a screening level identification rule that specifies a screening level that corresponds to those questions and thirty seconds of screening time. As another example, the model trainer 264 may analyze conversations between callers with a spam call confidence score of greater than 0.7 and various callees. The model trainer 264 may determine the questions that a majority of the callees ask the caller, which may occur in the first fifty seconds. In this case, the model trainer 264 may generate a screening level identification rule that specifies a screening level that corresponds to those questions and fifty seconds of screening time.

The model trainer 264 may be configured to train the screening level identification models 225 using machine learning and the historical data 240. The model trainer 264 may use the historical data 240 to generate data samples. The model trainer 264 may train the screening level identification models 225 using the data samples. A data sample may include data identifying a type of devices used by the caller and callee, the identity of the caller and callee, the location of the caller and callee, data from previous conversations, a spoofing confidence score, a spam confidence score, data from the conversation between the caller and callee, and/or any other similar information. The model trainer 264 may generate a data sample for each telephone call in the historical data. In some instances, some data samples may not include each portion of the information. For example, some data samples may include the type of devices used by the caller and callee, the identity of the caller and callee, the location of the caller and callee, the spam confidence score, and data from the conversation between the caller and callee. These data samples may not include spoofing confidence scores and/or data from previous conversations.

The model trainer 264 may group the data samples that include similar types of data. The model trainer 264 may train different models with each group of data samples. Each model may be configured to receive data similar to the type of data in the data samples. For example, if the data samples included data identifying a type of devices used by the caller and callee, the identity of the caller and callee, the location of the caller and callee, data from previous conversations, a spoofing confidence score, a spam confidence score, data from the conversation between the caller and callee, then the resulting screening level identification model may be configured to receive data identifying a type of devices used by the caller and callee, the identity of the caller and callee, the location of the caller and callee, data from previous conversations, a spoofing confidence score, and a spam confidence score and output a screening level that corresponds to the information to request from the caller and a time period for the screening process. As another example, if the data samples include the type of devices used by the caller and callee, the identity of the caller and callee, the location of the caller and callee, the spam confidence score, and data from the conversation between the caller and callee, then the resulting screening level identification model may be configured to receive the type of devices used by the caller and callee, the identity of the caller and callee, the location of the caller and callee, and the spam confidence and output a screening level that corresponds to the information to request from the caller and a time period for the screening process score.

A screening level identification model may be configured to receive the location data, the historical data 240, the spam call data, the spoofed call data, the device type data, the identity data, and/or any other data and output data indicating the screening level. The screening level identifier 252 may select a model depending on the data that the screening level identifier 252 receives. For example, if the screening level identifier 252 receives the spoofed call data, the device type data, and the identity data, then the screening level identifier 252 may select a model that is configured to receive that data and output data indicating the screening level. If the screening level identifier 252 receives the spam call data, the spoofed call data, and the identity data, then the screening level identifier 252 may select a model that is configured to receive that data and output data indicating the screening level.

The screening level identifier 252 may use the screening level identification models 225 and/or the screening level identification rules 230 to determine the screening level for the telephone call. The screening level may correspond types of information for the call screener 250 to collect and/or the minimum time period for the screening process. The screening level identifier 252 may provide the screening level to the dialog generator 254. The one or more processors 210 may implement the dialog generator 254. The dialog generator 254 may be similar to the dialog generator 130 of FIG. 1. The dialog generator 254 may be configured to generate lines of dialog to output to the caller based on the screening level that may correspond to the types of data that the call screener 250 should attempt to gather from caller. Some screening levels may specify to collect the name of the caller and the purpose of the telephone call. Other screening levels may specify to collect the name of the caller, the purpose of the telephone call, and the business purpose of an entity that the caller represents. Another screening level may specify to collect the purpose of the telephone call.

The screening level may also specify a minimum amount of time that the call screener 250 should screen the caller. Based on the information that the call screener 250 should attempt to collect, the dialog generator 254 may generate dialog to collect that information. For example, if the call screener 250 should collect the name of the caller, then the dialog generator 254 may generate the dialog, "Please state your name." As another example, if the call screener 250 should collect information on the last time that the caller communicated with the callee, then the dialog generator 254 may generate the dialog, "What did you last discuss with the person you are calling?" As another example, the screening level may indicate to collect information on the purpose of the telephone call. The dialog generator 254 may generate the dialog, "What is the purpose of your call?"

The dialog generator 254 may provide the dialog to the speech synthesizer 256. The one or more processors 210 may implement the speech synthesizer 256. The speech synthesizer 256 may be similar to the speech synthesizer 132 of FIG. 1. The speech synthesizer 256 may be configured to generate speech audio of received text. The speech synthesizer 256 may generate speech audio of dialog lines received from the dialog generator 254. In some implementations, the speech synthesizer 256 may generate speech audio using different voices. In this case, the callee may select the voice for the speech synthesizer 256 to use during the screening process. For example, the speech synthesizer 256 may generate speech audio of the dialog, "What is the purpose of your call?"

The communications interface 205 may output the speech audio of the dialog to the calling device. The caller may respond to the speech audio, and the communications interface 205 may receive reply audio from the calling device. The reply audio may encode the utterance that the caller spoke in response to the speech audio of the dialog. The call screener 250 may include a speech recognizer 258 that is configured to generate a transcription of reply audio. The one or more processors 210 may implement the speech recognizer 258. The speech recognizer 258 may be similar to the speech recognizer 142 of FIG. 1. The speech recognizer 258 may receive the reply and generate a transcription of the reply audio. The speech recognizer 258 may provide the transcription of the reply audio to the screening data generator 260. The one or more processors 210 may implement the screening data generator 260. The screening data generator 260 may be similar to the screening data generator 144 of FIG. 1. The screening data generator 260 may analyze the transcription of the reply audio, the screening level from the screening level identifier 252, and the information that the dialog generator 254 attempted to collect with the dialog of the speech audio. The screening data generator 260 may determine that the transcription of the reply audio includes the information that the dialog generator 254 attempted to collect with the dialog of the speech audio. The screening data generator 260 may generate screening data that includes information from the transcription of the reply audio.

The screening data generator 260 may make various determinations based on analyzing the transcription of the reply audio, the screening level from the screening level identifier 252, and the information that the dialog generator 254 attempted to collect with the dialog of the speech audio. A first determination may be that the transcription of the reply audio includes the information that the dialog generator 254 attempted to collect. In this case, the screening data generator 260 may generate screening data that includes information from the transcription of the reply audio and determine whether there are additional portions of information to collect based on the screening level from the screening level identifier 252. In some instances, the screening data generator 260 may determine that there are no additional portions of information to collect. In this case, the screening data generator 260 may output the screening data that includes the information that the dialog generator 254 attempted to collect. In some instances, the screening data generator 260 may determine that there are additional portions of information to collect. In this case, the screening data generator 260 may provide, to the dialog generator 254, an indication that some information was successfully collected from the caller. The dialog generator 254 may generate new dialog to attempt to collect the additional information according to the screening level.

A second determination of the screening data generator 260 may be that the transcription of the reply audio does not include the information that the dialog generator 254 attempted to collect. In this case, the screening data generator 260 may provide an indication to the dialog generator 254 that the information collection was not successful. In this case, the dialog generator 254 may generate additional dialog that attempts to collect the same information. The dialog generator 254 may generate additional dialog that requests the information in a different manner and/or that includes a response to the information in the reply audio of the utterance spoken by the caller. The dialog generator 254 may provide the additional dialog to the speech synthesizer 256, and the speech recognizer 258 and screening data generator 260 may analyze the response of the caller.

A third determination of the screening data generator 260 may be that the transcription of the reply audio does include the information that the dialog generator 254 attempted to collect and that there is no additional information to collect. However, the screening data generator 260 may determine that the minimum screening time has not elapsed. In this case, the screening data generator 260 may indicate to the dialog generator 254 to generate additional dialog. The additional dialog may be to collect information that may not be needed according to the screening level or may be to stall the screening process of the caller. For example, the screening data generator 260 may determine that the reply audio of the utterance of the caller includes the information specified by the screening level. The screening data generator 260 may determine that no additional information is required according to the screening level. The screening data generator 260 may determine that the time elapsed during the screening process is twenty seconds, which may be less than the time specified by the screening level of forty seconds. The screening data generator 260 may indicate to the dialog generator 254 to generate additional dialog without the goal of collecting specific information. The dialog generator 254 may generate the dialog of, "What's the name of your company?" or "Have you previously called the callee?" The dialog generator 254 may not be attempting to collect any information. Instead, the dialog generator 254 may be attempting to extend the time of the call screening. In some instances, the screening data generator 260 may include any additional information collected from the caller in the screening data, even if the screening level did not indicate to collect the additional information.

With the screening data generated, the screening data generator 260 may provide the screening data to the speech synthesizer 256. The screening data may be a textual summary of the information collected from the caller. For example, the screening data generator 260 may generate the screening data summary, "The call is regarding tomorrow's appointment." The speech synthesizer 256 may generate screening data audio of the screening data summary. The speech synthesizer 256 may generate screening data audio such that the screening data audio has a tempo selected by the speech tempo selector 262.

The one or more processors 210 may implement the speech tempo selector 262. The speech tempo selector 262 may be similar to the speech tempo selector 146 of FIG. 1. The speech tempo selector 262 may instruct the speech synthesizer 256 to generate the screening data audio of the screening data summary at a standard tempo, such as one hundred-fifty words per minute. In some instances, the speech tempo selector 262 may instruct the speech synthesizer 256 to generate the screening data audio of the screening data summary at a faster tempo, such as two hundred words per minute. The speech tempo selector 262 may select a tempo based on the time elapsed during the screening process and the time specified by the screening level. For example, the time specified by the screening level may be thirty seconds, and the time elapsed by during the screening process may be one minute. In this case, the speech tempo selector 262 may select a speech tempo faster than the standard tempo. The faster speech tempo may be two-hundred fifty words per minute. As another example, the time specified by the screening level may be thirty seconds, and the time elapsed by during the screening process may be thirty seconds. In this case, the speech tempo selector 262 may select a standard speech tempo such as one hundred fifty words per minute. In some implementations, the callee may specify a minimum speech tempo. In this case, the speech tempo selector 262 may select a speech tempo that is equal to or greater than the minimum speech tempo.

The communications interface 205 of the server 200 may provide the screening data audio to the called device. The called device may output the screening data audio. The callee may listen to the screening data audio and determine whether to answer the telephone call. Based on the decision of the callee, the server 106 may connect the telephone call to the called device or send the telephone call to the voicemail system.

In some implementations, one or more of the components of the server 200 may be implemented in the computing device communicating with the server 200. For example, a computing device similar to the computing device 110 of FIG. 1 may implement the call screener 250, the spam call identifier 268, the call spoofing identifier 270, the device type identifier 272, and/or the user identifier 274. In this case, the computing device may screen telephone calls in a manner similar to the server 200.

Figure 3:
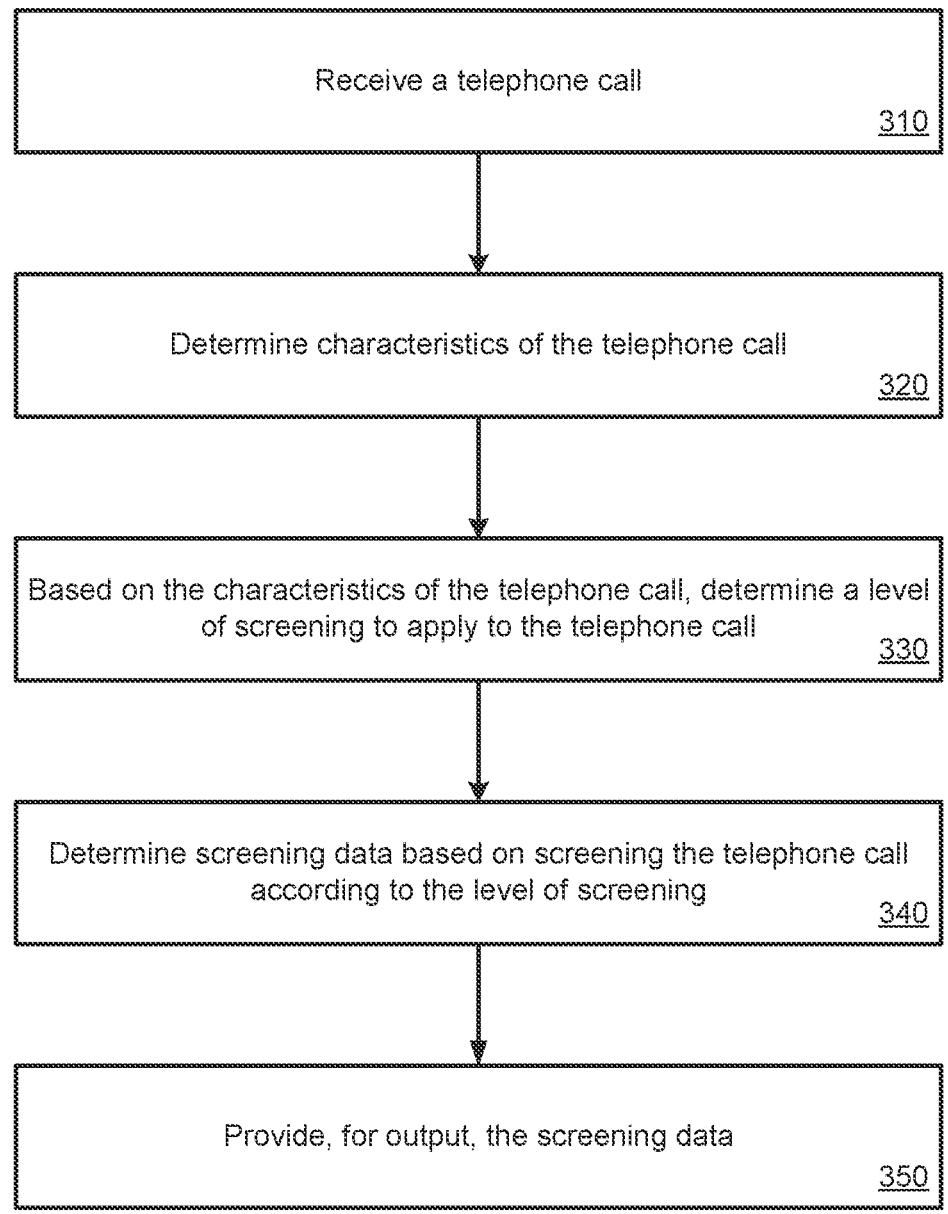
FIG. 3 is a flowchart of an example process for screening telephone calls at various screening levels based on the characteristics of the telephone call.

FIG. 3 is a flowchart of an example process 300 for screening telephone calls at various screening levels based on the characteristics of the telephone call. In general, the process 300 receives a telephone call and determines characteristics of that telephone call. Based on the characteristics of that telephone call, the process 300 determines a level of screening for screening the telephone call. The process 300 screens the telephone call according to the level of screening and outputs the screening data to the called party. The process 300 will be described as being performed by the server 106 of FIG. 1 and will include references to other components in FIG. 1. In some implementations, the process 300 may be performed by the server 200 of FIG. 2.

The server 106 receives a telephone call (310). The server 106 may receive a telephone call from a calling phone that is for a called phone. The server 106 determines characteristics of the telephone call (320). In some implementations, the characteristics of the telephone call may include the identity of a caller of the telephone call, an identity of a callee, a time of the telephone call, a calling history between the caller and a callee of the telephone call, and/or a calling history of the caller and the callee. In some implementations, the characteristics may include a spam confidence score that reflects a likelihood that the telephone call is a spam telephone call and a spoofing confidence score that reflect the likelihood that the phone number of the caller is a spoofed phone number.

Based on the characteristics of the telephone call, the server 106 determines a level of screening to apply to the telephone call (330). In some implementations, the level of screening may specify the screening questions to ask the caller. In some implementations, the level of screening may specify a minimum time period for the screening of the telephone call. In some implementations, the server 106 may determine a default level of screening for the telephone call. This may occur if the server 106 does not determine sufficient information related to the telephone call. For example, if the server 106 is unable to determine any more information than a phone number of the caller, then the server may select a default level of screening.

In some implementations, the server 106 may determine that the telephone call is likely a spam telephone call. The server 106 may also determine that the caller previously called the callee and that the server 106 screened that telephone call for a period of time. For the current telephone call, the server 106 may determine to screen the telephone call for longer than the period of time that the server 106 screened the previous telephone call. By increasing the period of time for screening the likely spam telephone call, the server 106 may increase the transaction cost for the spam caller, which may decrease the likelihood of calling the callee in the future.

The server 106 determines screening data based on screening the telephone call according to the level of screening (340). In some implementations, the server 106 may use a speech synthesizer to generate speech audio of the screening questions to ask the caller. The server 106 may analyze the caller's answers to the screening questions and generate screening data based on those answers. In some implementations, the screening data may be based in part on previous screening data gathered on the caller such as type of business of an entity that the caller represents.

The server 106 provides, for output, the screening data (350). In some implementations, the server 106 may provide the screening data to a speech synthesizer. The speech synthesizer may generate speech audio of the screening data. The server 106 may determine a speech tempo to output the speech audio of the screening data to the callee. For example, the server 106 may select a standard speech tempo such as one hundred-fifty words per minute. In some cases, the callee may specify to receive the screening data at a faster tempo, such as two hundred-fifty words per minute. The callee may listening to the speech audio of the screening data and determine whether to answer the telephone call.

Figure 4:
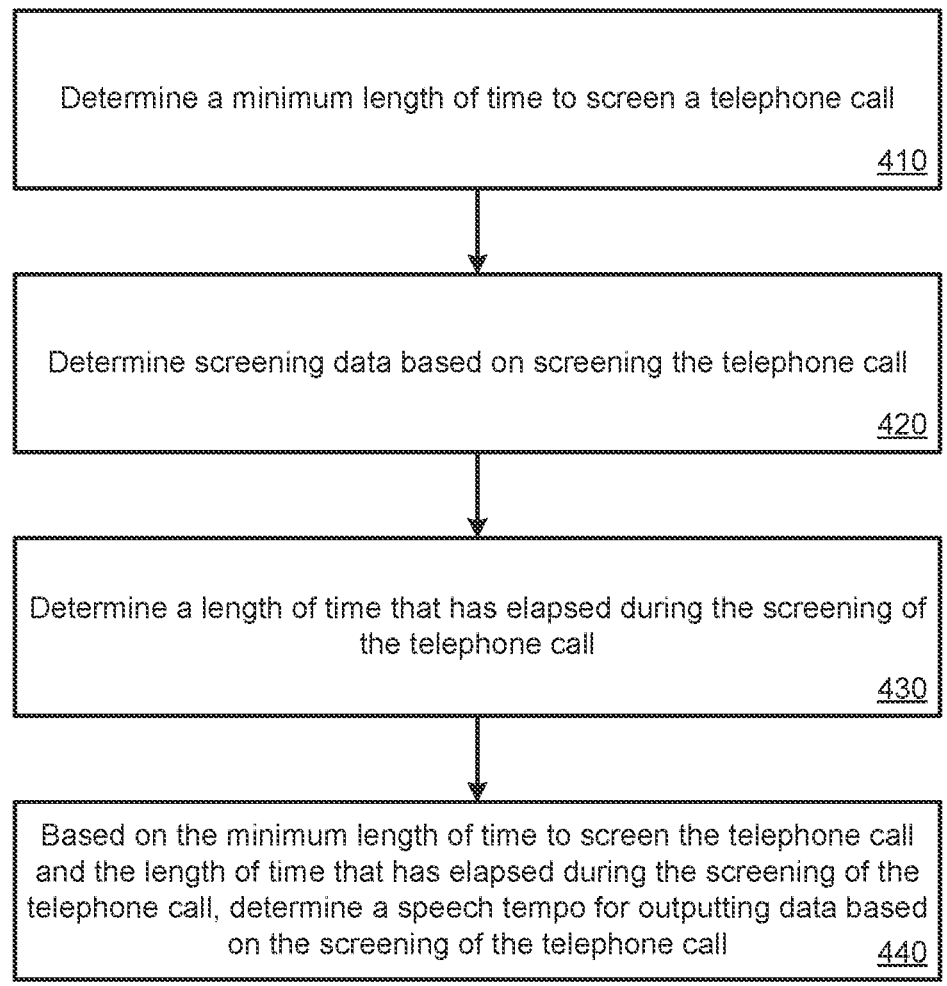
FIG. 4 is a flowchart of an example process for providing screening data to a called party at a tempo based on the time that elapsed during the screening process.

FIG. 4 is a flowchart of an example process 400 for providing screening data to a called party at a tempo based on the time that elapsed during the screening process. In general, the process 400 determines a minimum length of time to screen a telephone call. The process 400 screens the telephone call and generates screening data. Based on the time period that has elapsed during the screening and the minimum length of time, the process 400 determines a tempo to output the screening data to the called party. The process 400 will be described as being performed by the server 106 of FIG. 1 and will include references to other components in FIG. 1. In some implementations, the process 400 may be performed by the server 200 of FIG. 2.

The server 106 determines a minimum length of time to screen a telephone call (410). The server 106 may determine characteristics of the telephone call. The characteristics may include the location of the computing devices 108 and 110, previous communications between the caller 102 and the callee 104, previous communications of the caller 102, previous communications of the callee 104, the likelihood that the telephone call is a spam telephone call, the likelihood that the telephone number of the telephone call is a spoofed telephone number, the type of device of the computing devices 108 and 110, the identity of the caller 102 and callee 104, and/or any other similar factors. Based on the characteristics of the telephone call, the server 106 may determine a minimum length of time to screen the telephone call.

The server 106 determines screening data based on screening the telephone call (420). In some implementations, the server 106 may use a speech synthesizer to generate speech audio of the screening questions to ask the caller 102. The server 106 may analyze the caller's answers to the screening questions and generate screening data based on those answers. In some implementations, the screening data may be based in part on previous screening data gathered on the caller such as type of business of an entity that the caller represents.

The server 106 determines a length of time that has elapsed during the screening of the telephone call (430). The server 106 may measure the period of time from the beginning of the telephone call to the point when the server 106 determined that the requested screening information was collected. Based on the minimum length of time to screen the telephone call and the length of time that has elapsed during the screening of the telephone call, the server 106 determines a speech tempo for outputting data based on the screening of the telephone call (440). The server 106 may compare the minimum length of time to the elapsed time. If the elapsed time is greater than the minimum length of time, then the server 106 may select a speech tempo that is twice the standard speech tempo, such as twice one hundred-fifty words per minute. If the elapsed time is less than the minimum length of time and within a threshold time period of the minimum length of time, then the server 106 may select a speech tempo that is the standard speech tempo. If the elapsed time is less than the minimum length of time and not within the threshold time period of the minimum length of time, then the server 106 may output another screening question to the caller.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
receiving, by a computing device, a telephone call;
determining, by the computing device, characteristics of the telephone call;
based on the characteristics of the telephone call, determining, by the computing device, a level of screening to apply to the telephone call;
determining, by the computing device, screening data based on screening the telephone call according to the level of screening;
based on the screening data, generating, by the computing device, synthesized speech; and
providing, for output by the computing device, the synthesized speech at a speech tempo that is greater than a speech tempo of caller of the telephone call.

2. The method of claim 1, comprising:
based on the level of screening, determining screening questions to ask the caller of the telephone call during the screening of the telephone call.

3. The method of claim 1, comprising:
based on the level of screening, determining a minimum time period for the screening of the telephone call.

4. The method of claim 1, wherein:
determining the characteristics of the telephone call comprises determining an identity of the caller of the telephone call, a time of the telephone call, and a calling history between the caller and a callee of the telephone call.

5. The method of claim 1, wherein:
determining the characteristics of the telephone call comprises determining whether the telephone call is likely a spam telephone call and determining whether a phone number of the caller of the telephone call is a spoofed phone number.

6. The method of claim 1, wherein:
determining the level of screening to apply to the telephone call comprises determining a default level of screening.

7. The method of claim 1, comprising:
screening the telephone call according to the level of screening comprising generating and providing, for output, synthesized speech of screening questions.

8. The method of claim 1, wherein:
determining the characteristics of the telephone call comprises determining that the telephone call is likely a spam telephone call and that the caller of the telephone call previously called a callee of the telephone call, and
determining the level of screening to apply to the telephone call comprises determining a minimum time period for the screening of the telephone call that is greater than a previous time period of a previous screening of the caller of the telephone call.

9. The method of claim 1, comprising:
determining previous screening data based on screening previous telephone calls of the caller of the telephone call,
wherein determining the screening data is further based on the previous screening data.

10. A system, comprising:
one or more processors; and
memory including a plurality of computer-executable components that are executable by the one or more processors to perform a plurality of actions, the plurality of actions comprising:
receiving, by the one or more processors, a telephone call;
determining, by the one or more processors, characteristics of the telephone call;
based on the characteristics of the telephone call, determining, by the one or more processors, a level of screening to apply to the telephone call;
determining, by the one or more processors, screening data based on screening the telephone call according to the level of screening;
based on the screening data, generating, by the one or more processors, synthesized speech; and
providing, for output by the one or more processors, the synthesized speech at a speech tempo that is greater than a speech tempo of caller of the telephone call.

11. The system of claim 10, wherein the actions comprise:
based on the level of screening, determining screening questions to ask the caller of the telephone call during the screening of the telephone call.

12. The system of claim 10, wherein the actions comprise:
based on the level of screening, determining a minimum time period for the screening of the telephone call.

13. The system of claim 10, wherein:
determining the characteristics of the telephone call comprises determining an identity of the caller of the telephone call, a time of the telephone call, and a calling history between the caller and a callee of the telephone call.

14. The system of claim 10, wherein:
determining the characteristics of the telephone call comprises determining whether the telephone call is likely a spam telephone call and determining whether a phone number of the caller of the telephone call is a spoofed phone number.

15. The system of claim 10, wherein:
determining the level of screening to apply to the telephone call comprises determining a default level of screening.

16. The system of claim 10, wherein the actions comprise:
screening the telephone call according to the level of screening comprising generating and providing, for output, synthesized speech of screening questions.

17. The system of claim 10, wherein:
determining the characteristics of the telephone call comprises determining that the telephone call is likely a spam telephone call and that the caller of the telephone call previously called a callee of the telephone call, and
determining the level of screening to apply to the telephone call comprises determining a minimum time period for the screening of the telephone call that is greater than a previous time period of a previous screening of the caller of the telephone call.

18. One or more non-transitory computer-readable media of one or more computers storing computer-executable instructions that upon execution cause the one or more computers to perform acts comprising:
receiving, by the one or more computers, a telephone call;
determining, by the one or more computers, characteristics of the telephone call;
based on the characteristics of the telephone call, determining, by the one or more computers, a level of screening to apply to the telephone call;
determining, by the one or more computers, screening data based on screening the telephone call according to the level of screening;
based on the screening data, generating, by the one or more computers, synthesized speech; and
providing, for output by the one or more computers, the synthesized speech at a speech tempo that is greater than a speech tempo of caller of the telephone call.

* * * * *